Sept. 22, 1953 C. E. MORLEY 2,652,648
REARVIEW MIRROR CONSTRUCTION
Filed Nov. 17, 1948
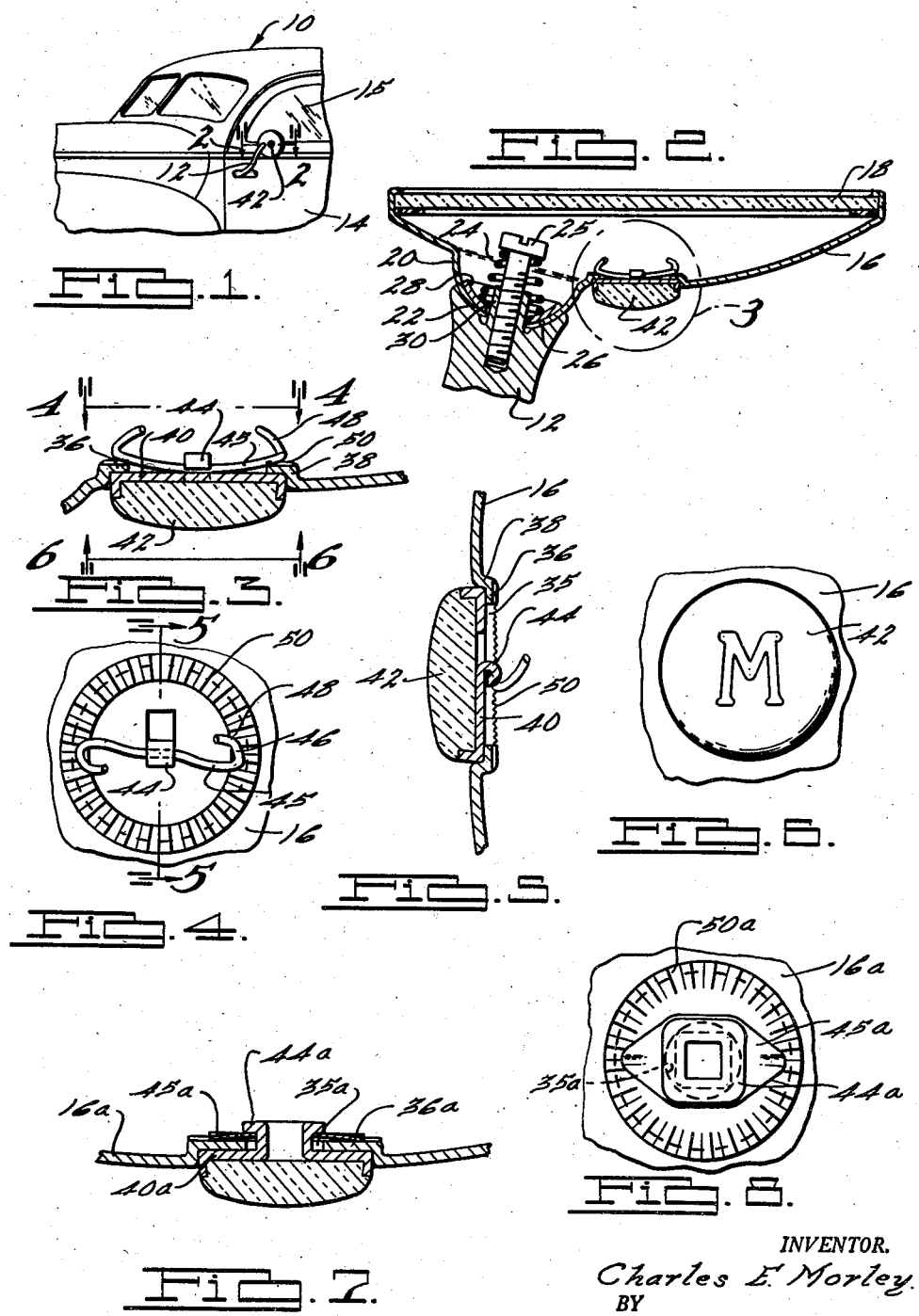
INVENTOR.
Charles E. Morley
BY
Harness, Dickey & Pierce
ATTORNEYS.

Patented Sept. 22, 1953

2,652,648

UNITED STATES PATENT OFFICE 2,652,648

REARVIEW MIRROR CONSTRUCTION

Charles E. Morley, Detroit, Mich.

Application November 17, 1948, Serial No. 60,570

2 Claims. (Cl. 40—20)

1

This invention relates to the construction of rear view mirrors of the type adapted for installation on the outside of vehicle bodies, and has as its principal object the provision of an improved mirror shell construction incorporating novel adjustable supporting means for an ornamental or identifying insignia or medallion piece.

An important object of the invention is to provide improved and substantially sealed but adjustable supporting means which is concealed from view and inaccessible but adapted to hold such an insignia piece or medallion rigidly in position, so that in effect it constitutes a part of the mirror structure and is guarded against unauthorized removal, yet which nevertheless permits the medallion or insignia piece to be rotated independently with respect to the mirror, so that the medallion or insignia piece may be arranged in a desired orientation regardless of the position in which the mirror is supported or the angular position to which the mirror is adjusted.

It is also an object of the present invention to provide improved supplemental supporting means of the indicated character which is very simple and inexpensive to construct and which permits economical manufacture of the adjustably supported parts.

A further object is to provide such an improved medallion supporting structure of the indicated class which allows the medallion piece to be very quickly and easily installed, either during manufacture or subsequently thereto, but which effectively prevents removal of the piece after installation thereof.

Other objects and advantages will be apparent upon consideration of the present disclosure in its entirety.

In the drawings:

Figure 1 is a fragmentary elevational view of a part of the body of a closed motorcar equipped with a rear vision mirror incorporating the present invention;

Figure 2 is a horizontal sectional view taken substantially on the line 2—2 of Figure 1;

Figure 3 is a sectional view upon a still larger scale of the portion enclosed within the circle 3 of Figure 2;

Figure 4 is a fragmentary elevational view taken substantially as indicated by the line and arrows 4—4 of Figure 3;

Figure 5 is a sectional view taken substantially on the line 5—5 of Figure 4;

Figure 6 is a fragmentary front elevational view taken substantially as indicated by the line and arrows as 6—6 of Figure 3;

2

Figure 7 is a fragmentary sectional view similar to Figure 3, showing a modified construction; and Figure 8 is a fragmentary rear elevational view of the modification shown in Figure 7.

Referring now to the drawings, reference character 10 designates generally a closed motorcar body shown as provided with an outside rear view mirror constructed in accordance with the present invention and including a supporting bracket portion 12 attached to the side of a door 14 of the vehicle in position to be visible through the window 15. Although the details of the construction and mode of attachment of the mirror bracket arm 12 to the vehicle are not material to my present invention, suitable structural features of this character are disclosed in my copending application Serial No. 6,699, filed February 6, 1948, and now abandoned.

At its outer end, the arm 12 carries a sheet metal shell 16 which supports and encases the rear face and the edges of the reflective mirror 18. The shell is provided with an integral, partly spherical boss 20 which fits into and is rockably supported with respect to a socket 22 in the end of the arm, these parts being held in assembled relation by means of a spring 24 within the embossed portion of the shell and surrounding and mounted upon the stem of a screw 25 which is fast in the arm 12 and projects through an enlarged hole 26 in the boss 20. A spherical washer 28 is urged against the inside of the boss by the spring 24 to maintain desired friction between the ball and socket portions and prevent leakage into the mirror shell. Preferably, a noncircular keying collar 30 integral with the arm 12 also projects through the opening 26 and through the washer 28, the aperture in the washer being proportioned and contoured conformably to the portion 30, so that the washer is thereby keyed against rotation.

The ball portion 20 is preferably located eccentrically or nonsymmetrically with respect to the shell, and an opening 35 is formed in a central area of the shell. The opening 35 is surrounded by an inset shoulder portion 36 which is pressed inwardly to lie below the surrounding surface of the mirror shell portion, to which it is connected by a substantially cylindrical wall 38.

The portions 36, 38 define a circular recess adapted to receive a bezel 40 which fits relatively snugly but rotatably therein and which, as shown, may carry an ornamental or identifying insignia or medallion piece 42. The bezel is formed as a dished sheet metal element having a central integral looped tongue 44 which is bent over upon and serves to retain a holding and ratchet element formed of a single piece of spring wire which extends substantially diametrically across the back of the bezel. As shown in Figures 3, 4 and 5, the central portion of the wire is held close to the back of the bezel by the retaining tongue 44, while the outwardly extending portions of the retaining wire are curved when viewed in plan (from the rear) as shown in Figure 4. In the intermediate portions 45 thereof, the curvature of the portions 45 being upon a relatively long radius and in a plane substantially parallel to the back of the bezel. At their outer extremities, the curved arm portions 45 are bent more sharply, and also substantially in the plane of the back of the bezel, to define portions 46 which are adapted to lie behind and bear against the inner surface of the shoulder 36. The extreme outer ends of the wire arms are bent angularly rearwardly away from the medallion piece and sloped inwardly toward one another, to define camming finger portions 48, the inner ends of which are closer together than a distance corresponding to the diameter of the opening 35.

The button like medallion and retaining wire assembly may be attached to the shell after the shell and mirror are assembled, simply by inserting the finger portions 48 in the opening 35 and pushing against the outer face of the medallion. It will be seen that inward pressure then exerted upon the medallion will cause the fingers 48 to slide through and bear against diametrically opposed parts of the opening 35. During insertion of the fingers in this manner, the portions 48 are cammed inwardly and cause the arm portions 45 to bow more sharply or about a shorter radius, until the portions 46, 48 are pushed entirely through the opening, whereafter the arms spring outwardly so that the portions 46, 48 lie behind the shoulder 36 to retain the medallion assembly in position.

Due to the fact that the bezel is then seated in the depression formed by the wall 38, it is literally impossible to pry the medallion out, despite the resilient nature of the spring retaining arms 45, since if a prying tool is forced between the bezel and the wall 38, rocking the tool to attempt to pry out the bezel tends to move the medallion laterally, in the plane of the shell, and merely cramps the bezel against the opposite side of the wall 38 instead of tending to move it outwardly from the shell. The resiliency of the spring arm portions 45 is such that the medallion may be turned by hand, so that any insignia carried thereby may be oriented with respect to the position of the mirror. If desired, the rear face of the shoulder portion 36 may be serrated, as indicated at 50, to increase the frictional engagement with the portions 46 which serve as detent means holding the medallion against unwanted turning under vibration.

Due to the ease with which medallion pieces so constructed may be installed merely by pushing them into place, it is practical to sell the mirrors to dealers without the medallions in place. Medallions having different initials or other insignia thereon may then be supplied separately to the dealer, so that they may be installed by the dealer or purchaser to suit the wishes of the latter.

The modified construction shown in Figures 7 and 8 is one suited for fabrication in the initial construction of the mirrors and requires installation of the medallion piece at that time. In this embodiment, parts analogous to those already described are designated by like reference characters distinguished by the addition of the letter *a*. The medallion retaining bezel 40*a* is seated in a depressed opening 35*a*, the opening being of relatively smaller size and surrounded by a correspondingly wider inset shoulder 36*a* than in the first embodiment. The sheet metal bezel is formed with an integral, centrally positioned, collarlike, hollow, projecting retaining portion 44*a* which is of square cross section and serves as a hollow rivet to hold a diametrically disposed flat leaf spring 45*a*, the spring being bowed so that it bears at its outer ends against the rear face of the shoulder 36*a* and resiliently holds the medallion assembly in position, frictionally opposing rotation thereof. The noncircular cross section of the retaining collar 44*a* serves as keying means to coact with an opening of similar shape in the spring 45*a*, so that the spring is keyed to turn with the medallion. Serrations as 50*a* are also preferably formed upon the rear portion of the shoulder 36*a* against which the retaining spring bears.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. A mirror supporting and backing construction including a hollow shell-like body having an aperture extending therethrough and a medallion member adapted to be supported upon the body in rotatable but substantially sealed engagement therewith, said medallion member having a closure portion adapted to bear against an outer surface of said body and a supporting portion projectable through the body including resilient holding means engageable with an inner portion of the body to urge said closure portion against said outer portion of the body, said resilient holding means comprising a transverse wire spring of generally S-shape when viewed as if projected into a plane parallel to the medallion, having a central portion substantially parallel to the plane of the medallion, inclined terminal camming portions bent out of the plane of the central portion and integral with said central portion and lying in a plane substantially perpendicular to the medallion and engageable with the aperture-defining parts of the body, and integral holding parts carried by the spring between said central portion and said terminal camming portions and spaced apart more widely than said camming portions and adapted to project behind the aperture-defining parts of the body.

2. A mirror supporting and backing construction including a hollow shell-like body having an aperture extending therethrough and a medallion member adapted to be supported upon the body in rotatable but substantially sealed engagement therewith, said medallion member having a closure portion adapted to bear against an outer surface of said body and a supporting portion projectable through the body including resilient holding means engageable with an inner portion of the body to urge said closure portion against said outer portion of the body, said resilient holding means comprising a transverse spring wire of generally S-shape when viewed as projected into a plane parallel to the medallion, having a central portion substantially parallel to the plane of the medallion, having integral inclined terminal camming portions forming a part of the projected S-shape but bent out of the plane of the central portion and lying in a plane substantially perpendicular to the medallion and engageable with the aperture-defining parts of the body, and also having latching portions more nearly parallel with the central portion.

CHARLES E. MORLEY.

References Cited in the file of this patent

UNITED STATES PATENTS

| Number | Name | Date |
| --- | --- | --- |
| 704,273 | Rosen | July 8, 1902 |
| 1,319,891 | Mueller et al. | Oct. 28, 1919 |
| 1,669,998 | O'Hara | May 15, 1928 |
| 1,737,375 | King | Nov. 26, 1929 |
| 1,858,410 | Morey | May 17, 1932 |